3,330,635
METHOD AND APPARATUS FOR DECONTAMINATING A GLASS SHEET MAKING MOLTEN METAL BATH
David Gordon Loukes, Prescot, and Alan Edwards, Widnes, England, assignors to Pilkington Brothers Limited, Liverpool, England, a corporation of Great Britain
Filed Aug. 17, 1964, Ser. No. 390,015
Claims priority, application Great Britain, Aug. 19, 1963, 32,759/63; Feb. 27, 1964, 8,260/64
21 Claims. (Cl. 65—27)

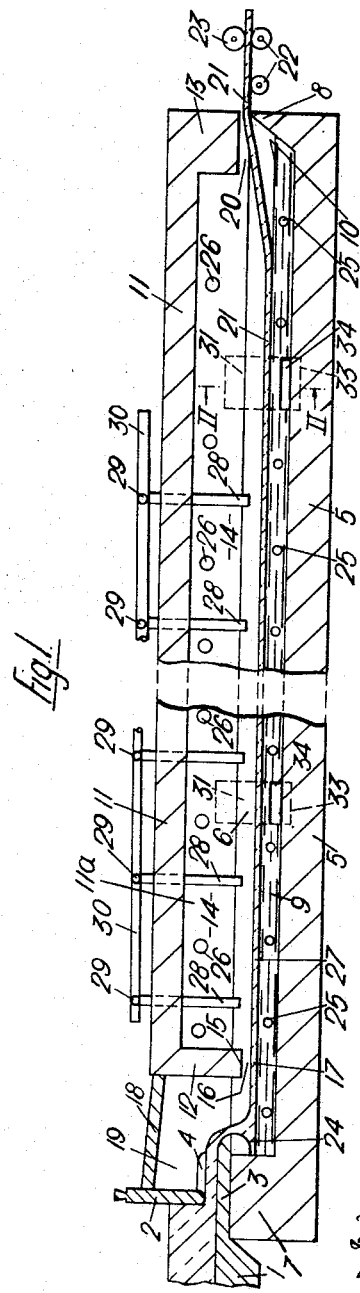

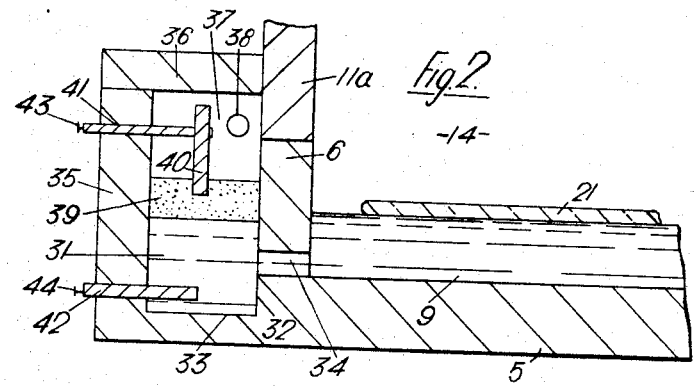
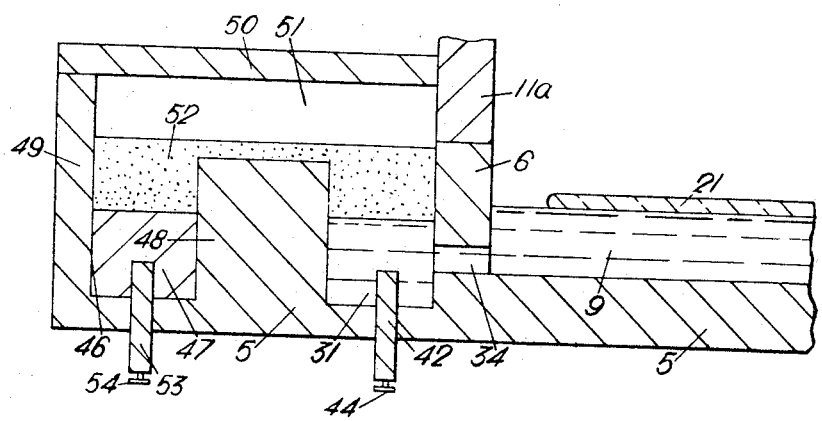

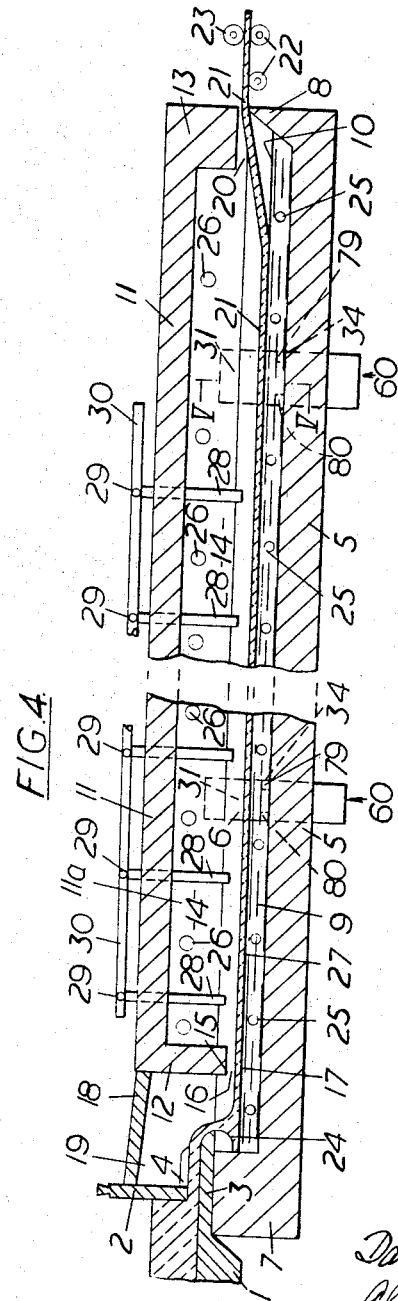

This invention relates to the manufacture of flat glass and in particular to the manufacture of flat glass during which the glass is in contact with molten metal, for example during which the glass is advanced in ribbon form over a bath of molten metal.

The molten metal is, for example, molten tin or a tin alloy having a specific gravity greater than glass, and when employing a bath of molten metal the bath is, for example, so constituted as to have all the characteristics fully described in U.S. Patent Nos. 2,911,759 and 3,083,551.

In order to scavenge impurities, for example oxygen and/or sulphur, from the molten metal, a trace of an element with which an impurity in the molten metal preferentially reacts may be maintained in the molten metal.

It is a main object of the present invention to provide quantitative control of the maintenance of a trace of an additive element in the molten metal.

It is another object of the invention to facilitate the introduction of certain additive elements into the molten metal.

According to the invention, in the manufacture of flat glass during which the glass is in contact with molten metal, a compound of an additive element for the molten metal is confirmed adjacent the molten metal, and a controlled electric current is applied to the compound so as to cause electrolysis of the compound and controlled entry into the molten metal of additive element released by the electrolysis. Preferably the compound of an additive element is a salt.

Further the invention comprehends, in the manufacture of flat glass in ribbon form during which the glass is advanced along a bath of molten metal, confining adjacent the molten metal of the bath a compound of an additive element for the molten metal, and applying a controlled electric current to the compound, so as to cause electrolysis of the compound and controlled entry into the bath of molten metal of additive element released by the electrolysis.

The additive element for the bath is released by the controlled electrolysis of the compound, and preferably the molten metal is at such a temperature that at least that part of the compound which is in contact with the molten metal is in molten form. Controlled entry of the released additive elements takes place into the surface of the molten metal from the compound.

The compound may be in the form of a protective layer on the surface of a molten metal bath over which the glass is advanced, but preferably according to the invention, a confined quantity of the compound is supported on the surface of the bath of molten metal, and said controlled electric current is passed through the compound and the molten metal on which the compound is supported.

The current is a controlled direct current which flows from the compound into the molten metal so as to enforce a controlled entry of released additive element into the molten metal supporting the compound.

The compound may be supported on the bath surface along which the glass in ribbon form is advanced but in a preferred embodiment of the invention the bath of molten metal includes a defined pocket of molten metal and the compound is supported on the surface of the molten metal in the pocket. Electrical connection is made to the compound and the molten metal in such a way that the molten metal in the pocket acts as a negative electrode, and said controlled electric current is passed through the compound and molten metal in the pocket. Controlled entry of additive element into the molten metal in the pocket is thus engendered and the additive element is diluted by the molten metal and diffuses through the whole molten metal bath along which the glass is advanced, to maintain the desired trace of said additive element in the molten metal bath.

The trace element in the bath may act to inhibit the formation in the bath of compounds of the bath metal, by scavenging impurities, for example traces of oxygen and/or sulphur from the bath.

Further according to the invention electrical connections may be made to said compound through an electrode of the additive element or an alloy thereof in such a way that the additive element electrode acts as a positive electrode, whereby the quantity of said compound present is maintained.

In order to assist the diffusion of additive element throughout the molten metal bath the compound supported on the surface of the molten metal in the pocket is in a liquid state in the region through which the electrolysis current passes, a controlled electric current is applied to the molten compound so as to cause electrolysis of the compound and controlled entry into the molten metal of additive element released by the electrolysis, and a circulation of the molten metal in the pocket is enforced to assist the diffusion of the additive element through the bath of molten metal.

The normal circulation of the molten metal in the pocket may alone provide sufficient assistance to the dilution of the additive element and the diffusion of the diluted additive element through the bath of molten metal. However in cases where it is desired to effect a greater economy in the quantity of additive element used, the diffusion of the additive element may be assisted by causing a flow of molten metal from the main part of the bath into the pocket, through the pocket and out of the pocket into the main part of the bath. This has the advantage that the additive element is always at a low concentration in the tin and consequently reaction of the additive element with any water vapour in the atmosphere, such as is liable to occur when a high concentration of additive element is present in the tin, is inhibited. The flow of molten metal from the pocket under the ribbon of glass carries the additive element under the ribbon of glass which also inhibits any reaction of the additive element diluted by the molten metal with water vapour in the atmosphere.

Further the invention may include heating the pocket of molten metal by inducing upward movement of heated molten metal in the pocket. Such upward movement in the pocket creates a movement of the molten metal at the interface of the molten metal and the supported compound and carries away additive element from the interface as soon as it is released at the interface by the electrolytic action.

If the temperature of the molten metal is sufficiently high the supported compound on the molten metal will be maintained in the liquid state by heat transference from the metal. Further according to the invention the supported compound may be heated by passing a controlled alternating current through the compound. The compound can thus be maintained molten even when the temperature of the molten metal is not sufficiently high.

In a preferred embodiment of the invention the molten metal is predominantly molten tin, and the compound of an additive element is one compound or a mixture of compounds selected from the group comprising halides of lithium, sodium, potassium, magnesium, calcium, strontium, barium, cerium, manganese, iron and zinc.

Of this group of compounds, preferred salts for scavenging the molten metal are lithium chloride, calcium chloride, magnesium chloride, manganese chloride and barium chloride.

Further according to the invention, the molten metal being predominantly molten tin, the additive metal compound may be one compound or a mixture of compounds selected from the group consisting of compounds of boron, aluminium, silicon, titanium, zirconium, niobium and tantalum. Complex fluorides may be employed, for example, sodium aluminium fluoride (cryolite), potassium fluorotitanate ($K_2TiF_6$) or potassium fluoborate ($KBF_4$) either alone or with the addition of another compound e.g. sodium chloride or potassium chloride to lower the melting point while at the same time facilitating electrolysis.

The invention also comprehends apparatus for use in the manufacture of flat glass in ribbon form comprising an elongated tank structure containing a bath of molten metal including a pocket of molten metal formed in the tank structure, means for advancing glass in ribbon form along the bath towards an outlet from the bath, electrical connections arranged in the pocket so as to pass electric current through a compound of an additive metal for the bath supported on the molten metal in the pocket, and means for supplying a controlled electric current to said electrical connections to cause electrolysis of the compound and controlled entry into the bath of molten metal of additive element released by said electrolysis.

Further according to the invention, in order to maintain a plenum of protective atmosphere over the bath along which the glass in ribbon form is advanced, a roof structure extends over the tank structure to define a headspace over the bath, and the pocket is located in a side wall of the tank structure and is segregated from the headspace by a partition extending downwardly into the bath metal to define with the floor of the tank structure a channel by which the pocket communicates with the bath.

Preferably one electrode, being, for example a carbon electrode, is positioned in the pocket above the surface level of the molten metal, so that it dips into the compound supported on the molten metal in the pocket, and another electrode is constituted by the molten metal, and the current supply means is so connected to the electrodes that the molten metal in the pocket constitutes a negative electrode.

Further, in apparatus according to the invention, channels may be formed in the tank structure and spaced apart longitudinally of the bath, by which channels the pocket communicates with the main part of the bath, and impeller means in one channel operable to cause a flow of molten metal through that channel such that molten metal enters the pocket through one channel and returns to the bath through the other channel after circulating through the pocket, whereby additive element released by the electrolysis is carried into the main part of the bath.

Preferably according to the invention the impeller means is a paddle wheel mounted in the upstream channel, and a motor connected to the paddle wheel is operable to cause the wheel to impel molten metal out of the pocket.

The heating of the molten metal in the pocket may be effected by an upward circulation of heated molten metal in the pocket, and in order to induce such an upward movement an electric induction heater may be mounted in the base of the pocket, communicating with the pocket.

Further according to the invention, in order to heat the supported compound, to maintain it molten during the electrolysis of the compound, auxiliary heating electrodes may be so mounted in the pocket as to dip into the compound supported on the molten metal in the pocket, said electrodes being for connection to an A.C. source operable to pass alternating current through the compound between the electrodes.

In another embodiment of apparatus according to the invention, the tank structure is extended beyond said pocket to form a reservoir for an additive element or an alloy of one or more additive elements, which reservoir is separated from said pocket, a cover extends over said pocket and reservoir to define a chamber thereover for accommodating a compound of one said additive element, one electrode is positioned in the reservoir, and another electrode is constituted by the molten metal in the pocket and the current supply means is so connected to the electrodes that said element or alloy acts as a positive electrode, whereby said compound is continually replenished by the interaction of an element released at the positive electrode with fresh additive element from said reservoir.

In order that the invention may be more clearly understood some embodiments thereof will now be described, by way of example, with reference to the accompanying drawings in which:

FIG. 1 is a central longitudinal sectional elevation of apparatus according to the invention comprising an elongated tank structure containing a bath of molten metal, and a superimposed roof structure, and indicating the position of pockets in one side wall of the tank structure.

FIG. 2 is a section on line II—II of FIG. 1 showing in detail the construction of one of the pockets in the tank side wall, and FIG. 3 is a view similar to FIG. 2 of a modified arrangement according to the invention, FIG. 4 is a view similar to FIG. 1 of another embodiment of the invention.

In the drawings the same reference numbers designate the same parts.

Figure 5:
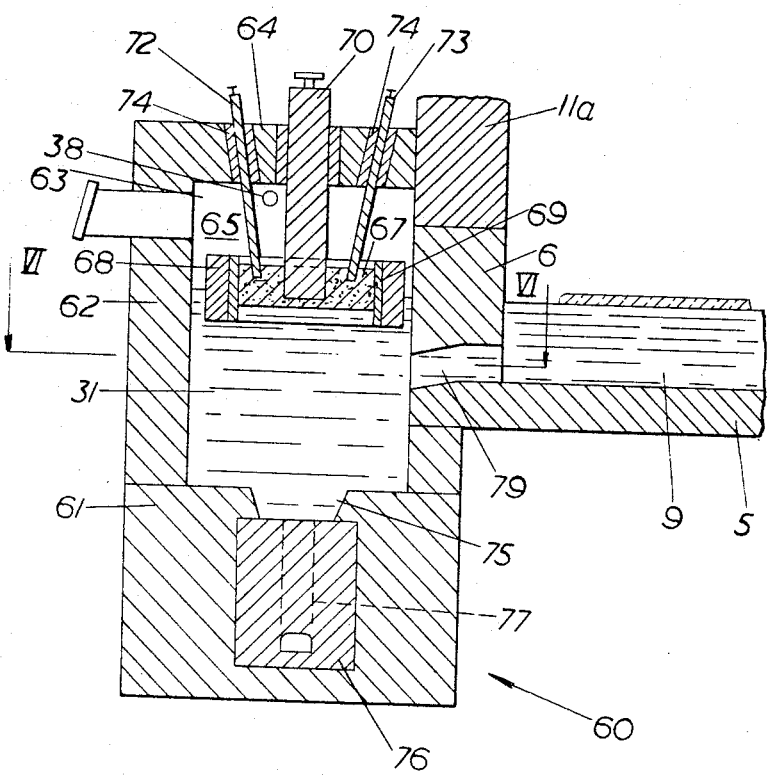
FIG. 5 is a section on line V—V of FIG. 4.

Referring to FIG. 1 of the drawings, a forehearth of a continuous glass melting tank is indicated at 1, and a regulating tweel at 2. The forehearth ends in a spout comprising a lip 3 and side jambs 4, one of which is shown. The side jambs 4 and lip 3 form a spout of generally rectangular cross-section. A cover may be secured over the spout in known manner.

The spout 3, 4 is disposed above the floor 5 of a tank structure including side walls 6 joined together by end walls 7 and 8 integral with the side walls 6 and the floor 5. This tank structure contains a bath 9 of molten metal, for example molten tin or an alloy of tin having a specific gravity greater than glass. The level of the surface of the bath is indicated at 10.

A roof structure is supported on the tank structure, and the roof structure includes a roof 11, side walls 11a and end walls 12 and 13 respectively at the inlet and outlet ends of the bath. The roof structure thus provides a tunnel over the bath and defines headspace 14 over the bath.

The lower face 15 of the end wall defines with the surface 10 of the bath an inlet 16, which is restricted in height, for glass 17 in ribbon form as the glass is advanced over the bath. The roof structure is extended to the tweel 2 by a roof element 18, and side walls 19 which form a chamber in which the spout is situated. The lower face of the end wall 13 of the roof structure defines with the end wall 18 of the tank structure an outlet 20 for the ultimate ribbon of glass 21 which is discharged from the bath.

Driven conveying rollers 22 are mounted outside the outlet end of the tank and are disposed somewhat above the level of the top of the tank end wall 8. Superimposed driven rollers 23 are provided, and the rollers 22 and 23 co-operate to apply a tractive effort to the ribbon of glass 21 moving towards the outlet 20 from the bath, which tractive effort assists in advancing the ribbon of glass along the bath. The ribbon 21 is directed by the rollers to a conventional tunnel lehr in which the ribbon is annealed, as is well understood in the art, and on leaving the lehr the ribbon is cut into sheets of desired size.

Molten glass is poured on to the bath 9 of molten metal from the spout 3, 4. The tweel 2 regulates the flow of molten glass from the spout lip 4 and the spout is vertically spaced from the surface of the bath so that the molten glass has a free fall of a few inches to the bath, which distance is such as to ensure a heel 24 of molten glass being formed behind the glass falling from the spout, which heel extends rearwardly to the end wall 7 of the tank structure.

The temperature of the bath is regulated from the inlet end to the discharge end by providing thermal regulators 25 immersed in the molten metal bath 9. Radiant heaters 26 are provided in the headspace 14 to assist the temperature regulation. The temperature regulators 25 and 26 at the inlet end of the bath are devised to maintain the temperature at the inlet end at about 1,000° C. or slightly higher over a sufficient length of the bath to ensure that the molten glass is advanced along the bath as a buoyant layer of molten glass 17 from which is developed a buoyant body of molten glass 27. The width of the tank structure is somewhat greater than the width of the buoyant body 27 at the surface level of the bath so that the buoyant layer 17 is able to flow laterally unhindered to the limit of its free flow to develop the buoyant body 27 of molten glass which is then advanced in ribbon form along the bath.

The temperature regulators 25 and 26 spaced down the bath maintain a temperature gradient such that the ribbon is cooled to a state in which it can be taken off the bath unharmed by mechanical means by the time it nears the outlet end of the bath. That is the ribbon 21 has been progressively cooled to a temperature of about 600° C. before being taken up off the bath by the conveying rolls 22 as shown in FIG. 1.

The roof structure 15 is at intervals provided with ducting 28 connected by branches 29 to headers 30 through which a protecting gas is fed into the headspace 14 over the bath to create a plenum of protecting gas in the substantially closed headspace. The protecting gas is a gas which will not react chemically with the metal of the bath to produce contaminants for the glass, and therefore protects the bath surface at the sides of the ribbon and under the end of the stiffened ribbon 21 leaving the bath. Ingress of external atmosphere through the restricted inlet 16 and outlet 20 is substantially prevented.

A trace of an additive element is maintained in the molten metal bath 9 to react with impurities in the bath, for example oxygen and/or sulphur which may be present in the atmosphere over the bath or may migrate into the bath from the glass delivered to the bath. In order to scavenge these impurities from the bath it has been found advantageous to maintain in the bath a trace of an additive element with which the impurities react preferentially rather than with the metal of the bath.

In order to provide continuous quantitative control of the trace of additive element in the bath the electrolytic method of the invention has been devised for causing controlled entry of the additive element into the molten metal bath 9.

To this end pockets 31 for molten metal of the bath are formed in one or both side walls 6 of the tank structure. Two pockets 31 are indicated in FIG. 1, but there may be more than two pockets spaced at regular intervals down one or both side walls 6. One of the pockets is illustrated in greater detail in FIGURE 2.

As shown in FIG. 2 the pocket is formed by an extension of the floor 5 of the tank structure with a stepped down formation as shown at 32 in FIG. 2. The floor 33 of the pocket is lower than the floor 5 of the tank and the side wall 6 of the tank structure forms a partition extending downwardly into the bath metal 9 towards the floor 5 of the tank structure to define with the floor 5 of the tank a channel 34 by which the pocket 31 communicates with the main part of the bath 9. The slot shape of the channel 34 is also indicated in FIG. 1.

The pocket 31 has an outer wall 35 integral with the floor 33 and the wall 35 supports a roof 36 extending between the top of the wall 35 and the side wall 11a of the roof structure which rests directly on the side wall 8 of the tank structure. There is thus a headspace 37 over the molten metal in the pocket 31 and a duct 38 connects with this headspace 37 to enable a flow of atmosphere to be maintained through the headspace 37.

A layer 39 of a compound of an additive element for the bath is confined in the pocket, being supported on the surface of the molten metal in the pocket. One electrode 40, preferably a carbon electrode, is mounted in the headspace 37 on an electrically conductive support 41 which passes through the outer wall 35 of the pocket. The position of the electrode 40 is so adjusted that the bottom of the electrode dips into the layer of compound 39 but does not contact the molten metal in the pocket.

Electrical connection is made to the molten metal in the pocket by means of a second carbon bar 42 which is mounted horizontally in the side wall 35 near the floor 33 of the pocket. Terminals 43 and 44 are provided for connection to a source of direct current, which is so connected to the terminals 43 and 44 that the electrode 40 is a positive electrode and the metal in the pocket 31 is a negative electrode.

When current is passed between the electrode 40 and the molten metal in the pocket 31 electrolysis of the compound takes place, the layer 39, or at least that part of it through which the electrolysis current passes, being in a molten state, which molten state is assured when the pocket 31 is positioned at such a distance from the outlet end of the bath that in the region where the pocket is located the temperature of the molten metal bath is high enough to keep the layer molten. Alternatively the pocket may be heated to keep the layer in a molten condition.

Preferably the layer 39 is a layer of salt of the additive element. Salts which may be used are for example halides of lithium, sodium, potassium, zinc, manganese, magnesium, calcium, barium, cerium, strontium and iron. Preferred salts which are used are lithium chloride, calcium chloride, magnesium chloride, manganese chloride and barium chloride. Mixtures of two or more of these halides may be used in order for example to lower the melting point of the layer or to facilitate electrolysis.

Complex compounds or double salts may be employed in the case of other additive elements, for example aluminium, boron, silicon, niobium, titanium, zirconium, or tantalum. Three such compounds which are used with advantage are sodium aluminium fluoride (cryolite), potassium fluorotitanate i.e. potassium titanium fluoride ($K_2TiF_6$) or potassium fluoborate i.e. potassium boron fluoride ($KBF_4$).

Additions of other compounds, for example sodium or potassium chloride may be made to enable electrolysis of these complex compounds or double salts to be carried out at a lower temperature, also to facilitate electrolysis.

When current is passed between the electrode 40 and the molten metal in the pocket 31, the molten metal in the pocket 31 becomes the negative electrode and electrolysis of the layer 39 takes place. The additive element is released from the compound and enters the molten metal in the pocket 31. The additive element entering the molten metal in the pocket migrates through the channel 34 into the bath 9 to maintain the required trace of additive element in the bath. By controlling in known manner the direct current, for example a current of 100 amps at 5 volts, the entry of additive element into the molten metal bath is controlled. As electrolysis proceeds the gas evolved, for example chlorine, is cleared from the headspace 37 by the flow of atmosphere maintained through the duct 38. Since the headspace 37 over the pocket is completely segregated from the headspace 14 over the main part of the bath there is no danger of gaseous products of the electrolysis reaching the headspace 14 over the bath.

Additive element released into the molten metal in the pocket diffuses from the pocket into the main part of the bath, and in this way a required overall concentration of additive element is maintained in the bath, for example a concentration in a range of the order of 10 to 50 parts per million.

A modification of the invention is illustrated in FIG. 3 which shows an example of a modified tank structure to permit an additive element, which is usually a metal, to enter the bath metal in the pocket 31 by way of an electrolytic cell one of whose electrodes is constituted by the additive metal.

The tank structure is extended beyond the pocket 31 to form a reservoir 46 for molten additive metal 47 or an additive metal alloy. The reservoir 46 is separated from the pocket 31 by a wall 48 extending upwardly from the tank floor 5, and the outer wall 49 of the reservoir extends upwardly above the level of the wall 48. A cover 50 extends over the pocket 31 and the reservoir 46 between the top of the wall 49 and the side wall 11a of the roof structure, so defining a chamber 51 over the pocket and reservoir. A layer 52 of a compound of the additive metal is confined in the chamber 51, and is in contact with both the molten bath metal in the pocket 31 and with the molten additive metal 47 in the reservoir. The bar 42 extends through the floor of the pocket 31 into the molten metal in the pocket, and an electrical connector 53 is fixed in the floor of the reservoir and extends into the molten additive metal 47 in the reservoir.

The connector 53 has a terminal 54 and the terminals 44 and 54 are so connected to the current supply means that the pocket 31 of molten bath metal is the negative electrode and the reservoir of molten additive metal is the positive electrode. When the electrolysing current is applied to these terminals the compound is continually replenished by the interaction of an element released at the positive electrode with fresh additive metal from the reservoir.

This modified apparatus finds particular application when employing an additive element, compounds of which, e.g. salts, are more difficult to obtain, or more expensive, than the element itself, since the quantity of compound in the layer 52 does not appreciably diminish, the process being fed by adding metal to the molten additive metal 47 in the reservoir 46. Another advantage lies in the fact that substantially no gaseous products of the electrolytic action are given off. Thus when the layer 52 is a layer of manganese chloride, and the molten metal 47 is a manganese/tin alloy, for example, no substantial amount of chlorine is given off from the manganese chloride layer into the chamber 51.

Figure 6:
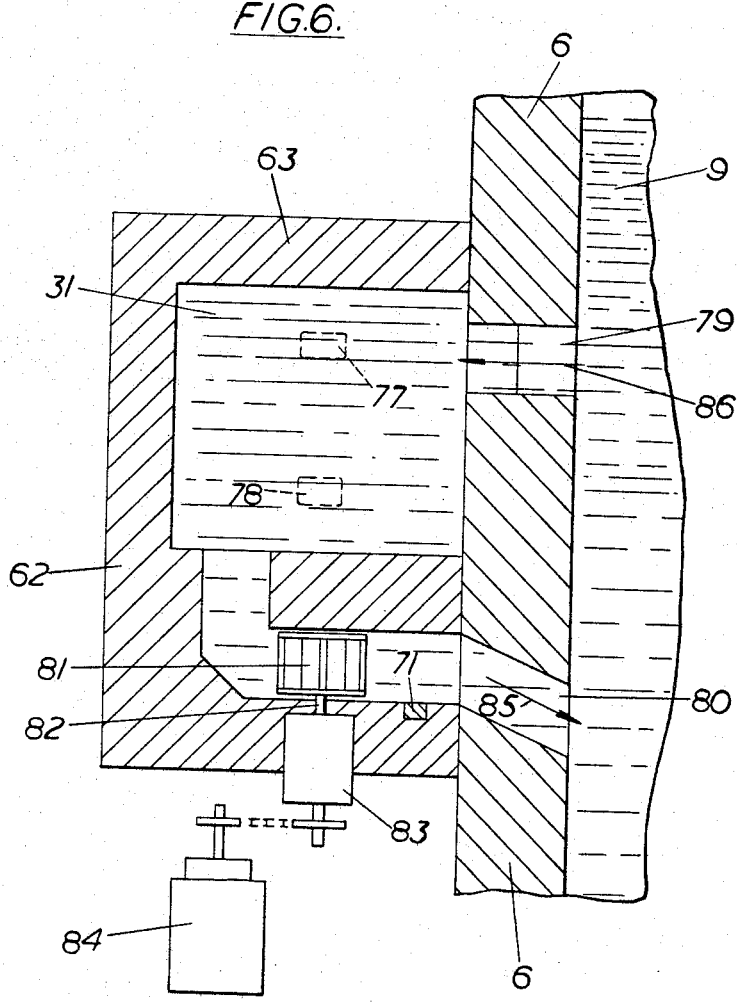
FIG. 6 is a section on line VI—VI of FIG. 5.

In order to assist the diffusion of additive element throughout the molten metal bath, another embodiment of the invention, illustrated in FIGS. 4 to 6, may be employed. Pockets 31 of molten metal of the bath are formed in one or both side walls 6 of the tank structure. Two pockets 31 are indicated in FIGURE 4 but there may be more than two pockets spaced at intervals down one or both side walls 6 of the tank structure. One of the pockets is illustrated in greater detail in FIGS. 5 and 6.

As shown in FIG. 5 a pocket 31 of molten metal is formed in an extension 60 of the floor 5 of the tank structure. The pocket has a floor 61, an outer wall 62 resting on the floor 61, and side walls 63. The walls 62 and 63 support a roof 64 extending between the top of the wall 62 and the side wall 11a of the roof structure which rests directly on the side wall 6 of the tank structure. There is thus a headspace 65 over pocket 31 of molten metal and a duct 38 connects with this headspace to enable a flow of atmosphere to be maintained through the headspace 65.

The pocket 31 communicates with the main part of the bath through channels, to be described below, which slope downwardly from the main part of the bath through the side wall 6 of the tank structure.

A layer 67 of a compound of an additive element for the bath is confined in the pocket, being supported on the surface of the molten metal in the pocket. The layer is contained by a carbon frame 68 which has a thin inner lining 69 of refractory material, preferably of a nonporous nature. The carbon frame 68 is impermeable to the molten salt, and the lining 69 acts as an electrically insulating layer to prevent current through the salt layer 67 taking an undesirable path through the carbon frame.

One electrode 70, preferably a carbon electrode, for example a graphite electrode, is mounted in the headspace 65 and passes up through the roof 64 of the pocket. The position of the electrode 70 is adjusted so that the bottom of the electrode dips into the layer 67 but does not contact the molten metal 31.

A connector bar 71 is shown in FIG. 6, mounted in a side wall of one of the channels leading to the pocket and in contact with the molten metal. The electrode 70 and the bar 71 are connected to a source of direct current, which is so connected to the electrode 70 and the bar 71 that the electrode 70 is a positive electrode and the pocket of molten metal 31, is a negative electrode.

When direct current is passed between the electrode 70 and the bar 71 electrolysis of the compound takes place, the layer 67 being in a molten state. This molten state is assured when the pocket 31 is located at positions in the bath where the temperature of the molten metal bath is high enough to keep the layer molten.

At or near the outlet end of the bath however the temperature of the molten metal may not be sufficient to maintain the layer molten. For example, the layer of compound may be a layer of a mixture of calcium chloride and barium chloride having a freezing point of about 600° C., whereas the temperature of the molten metal at the outlet end of the bath may also be in the region of 600° C. In such circumstances in order to keep the layer molten auxiliary heating electrodes 72 and 73 are mounted in the roof 64, being held in insulating bushings 74 which pass through the roof 64. The electrodes 72 and 73 dip into the layer 67 on either side of the main electrode 70 and are connected to a source of alternating current which passes between the electrodes through the compound and keeps the layer 67 molten. A current of 100 to 400 amperes may be passed, for example, and 5 kilowatts of power may be dissipated in heating the layer 67, which heating maintains the layer at a temperature of about 750° C. when the temperature of the molten metal in the pocket is about 620° C. This heating of the pocket enables the invention to be used right down to the cold end of the bath and extends the range of salts which may be used and may facilitate electrolysis.

The auxiliary heating of the layer 67 enables a pocket 31 of molten metal to be positioned anywhere along the bath where scavenging of the molten metal is most desirable. It also serves to assist the electrolysis of the compound even when the temperature of the molten metal is sufficient to maintain the compound molten, because it has sometimes been found advantageous to maintain the temperature of the pocket of molten salt 67 higher than the general bath temperature in the region where the pocket is located. An upward flow of heated molten metal may also be induced in the pocket in the manner which will be described below thus giving an advantageous upward circulation of heated molten metal at the interface between the molten metal and the layer 67.

Preferably the molten metal is predominantly molten tin and the layer 67 is constituted in the same manner as the layer 39 described above with reference to FIG. 2.

Additions of other compounds, for example sodium or potassium chloride may be made to enable electrolysis of the complex compounds or double salts to be carried out at lower temperatures, either with or without the passage of heating current between the auxiliary electrodes 72 and 73.

The floor of the pocket is recessed as shown at 75 and an induction heater 76 is mounted in the floor in this recess. The inductor 76 has two legs 77 and 78 (see FIGURE 6) and causes an upward circulation of heated molten metal in the pocket. The molten metal is heated in the inductor so that there is a continual upward movement of heated metal towards the bottom of the layer 67 which movement assists in maintaining the layer in molten condition. Also the movement of molten metal at the interface of the layer 67 and the molten metal assists the dilution of the additive element as it is released at the interface and the diffusion through the molten metal of the released additive element.

The pocket 31 communicates with the main part of the bath through two channels 79 and 80, which slope upwardly from the pocket to the bath. As shown in FIGURE 1 the channels 79 and 80 are spaced apart longitudinally of the bath, the channel 79 being downstream of the channel 80, and the channel 80 being inclined in the upstream direction. The channel 79 is formed through the side wall of the tank structure, but the channel 80 is of L-shaped form extending through one of the side walls 63 of the pocket.

A paddle wheel impeller 81 is mounted in the channel 80, being mounted on the output shaft 82 of a gear box 83 which is driven by a motor 84 mounted outside the pocket. The paddle wheel 81 has peripheral vanes and impels the molten metal through the channel 80 in the direction of the arrow 85. This generates a circulation of molten metal through the pocket 31, metal being drawn into the pocket through the channel 79 as indicated by the arrow 86. By this flow of molten metal through the pocket additive element released by the electrolysis in the pocket is immediately diluted and carried into the main part of the bath. The flow of molten metal enforced in the pocket thus assists the diffusion of the diluted additive element through the bath of molten metal. The channels 79 and 80 are spaced sufficiently far apart down the side wall of the tank to avoid any substantial recirculation of molten metal from the channel 80 back into the channel 79. This is assisted by the sloping of the channel 80 which points away from the channel 79. If desired, the direction of flow of molten metal through the pocket may be reversed by reversing the motor 83.

By controlling in known manner the direct current, for example a current of 100 amps at 5 volts, passing between the electrode 70 and the bar 71 the entry of additive element into the molten metal in the pocket is controlled. As electrolysis proceeds the gas evolved, for example chlorine is cleared from the headspace by the flow of atmosphere maintained throuh the duct 38.

Additive element released into the molten metal in the pocket is thus immediately diluted by the molten metal in the pocket and is then carried from the pocket into the main part of the bath, and in this way a required overall concentration of additive element is maintained in the bath, for example a concentration in the range of the order of 10 to 50 parts per million. Diffusion of the diluted additive element into the main part of the bath is assisted by the enforced circulation of the molten metal in the pocket according to the invention, and the invention is particularly useful in maintaining the desired overall and uniform concentration of diluted additive element in the bath.

The invention thus provides in the manufacture of flat glass in ribbon form during which the glass glides over a molten metal surface, means for causing continuous controlled entry of an additive element into the molten metal so that the level of trace element maintained in the molten metal is subject to fine control by adjustment of the current supplied to the electrodes.

The electrolytic method described above, in which one electrode is the molten metal of the bath, enables an additive element to be dissolved in the metal of the bath at higher rates and at a lower temperature than might otherwise have been possible. It is thus possible to use high melting point elements, for example, titanium, as the additive element for scavenging the bath, without having to introduce the additive element into the bath at the hot end of the tank structure.

An additional advantage of the present invention is that it avoids the necessity of pre-alloying certain very chemically-active additive elements, and no metal oxide is introduced into the bath with the additive metal itself since the freshly formed metal has no chance of coming into contact with oxidising atmosphere before it enters the bath metal. This is particularly advantageous in the case of chemically-active metals, for example lithium and barium.

Also metals which are not readily available in pure metallic form, but are available as salts may be employed as additives.

It will be apparent that the invention may be applied to any process for the manufacture of flat glass in ribbon form during which the glass is advanced over molten metal, for example a process in which a rolled ribbon of glass is delivered to a bath of molten metal.

The invention also comprises flat glass procured by a method as described above and sheets of glass cut therefrom.

We claim:
1. In the manufacture of flat glass during which the glass is in contact with molten metal, confining in contact with the molten metal for the decontamination of the molten metal a halide of an element with which a member of the group consisting of oxygen and sulphur preferentially reacts, applying direct electric current to the halide sufficient to cause electrolysis of the halide and regulating said electric current to control the entry into and the maintenance of at least a trace in the molten metal of such element released by the electrolysis.

2. In a method of manufacturing flat glass in ribbon form during which the glass is advanced along a bath of molten metal, confining in contact with the molten metal of the bath a halide of an additive element with which oxygen and sulphur in the bath react in preference to reaction with the molten metal and applying direct electric current to the halide sufficient to cause electrolysis of the halide, and regulating said electric current to control entry into the bath of molten metal of additive element released by the electrolysis, thereby maintaining at least a trace of said additive element in the bath.

3. A method according to claim 2, wherein a confined quantity of the halide is supported on the surface of the bath of molten metal, and said controlled electric current is passed through the halide and the molten metal on which the halide is supported.

4. A method according to claim 3, wherein the bath of molten metal includes a defined pocket of molten metal, and the halide is confined on the surface of the molten metal in the pocket.

5. A method according to claim 4, wherein electrical connection is made to the halide and the molten metal in such a way that the molten metal in the pocket acts as a negative electrode, and said controlled electric current is passed through the halide and the molten metal in the pocket.

6. A method according to claim 5, wherein electrical connection is made to said halide through an electrode of a material selected from the group consisting of the additive element and alloys thereof in such a way that said electrode acts as a positive electrode, whereby the quantity of said halide present is maintained.

7. In the manufacture of flat glass in ribbon form during which the glass is in contact with a bath of molten metal including a defined pocket of molten metal, supporting on the surface of the molten metal in the pocket a halide of an additive element for the decontamination of the molten metal, with which additive a member of the group consisting of oxygen and sulphur in the bath reacts in preference to reaction with the molten metal, said halide being in a liquid state in the region through which the electrolysis current passes, applying direct electric current to the halide sufficient to cause electrolysis of the halide, regulating said electric current to control entry into the molten metal of additive element released by the electrolysis, thereby controlling the maintenance of at least a trace of additive element in the bath, and enforcing circulation of the molten metal in the pocket to assist the diffusion of the additive element through the bath of molten metal.

8. A method according to claim 7, comprising causing a flow of molten metal from the main part of the bath into the pocket, through the pocket and out of the pocket into the main part of the bath.

9. A method according to claim 7, including heating the pocket of molten metal by inducing upward movement of heated molten metal in the pocket.

10. A method according to claim 7, including heating said supported halide of an additive element, by passing a controlled alternating current through the halide, thereby ensuring sufficient heat at the interface across which electrolysis takes place.

11. In the manufacture of flat glass during which the glass is in contact with molten metal, confining in contact with the molten metal a halide of an additive element for the molten metal with which additive element oxygen and sulphur present in the molten metal as impurity react in preference to reaction with the molten metal, and applying direct electric current to said halide sufficient to cause electrolysis of the halide, and regulating said electric current to control entry into the molten metal of additive element released by the electrolysis, thereby maintaining at least a trace of said additive element in the molten metal.

12. A method according to claim 11, wherein the molten metal is predominantly molten tin, and the halide of an additive element is one halide or a mixture of halides selected from the group consisting of halides of lithium, sodium, potassium, magnesium, calcium, strontium, barium, cerium, manganese, iron and zinc.

13. A method according to claim 11, wherein the molten metal is predominantly molten tin, and the additive metal halide is selected from the group consisting of halides of boron, aluminium, silicon, titanium, zirconium, niobium and tantalum.

14. Apparatus for use in the manufacture of flat glass in ribbon form, comprising an elongated tank structure containing a bath of molten metal including a pocket of molten metal formed in the tank structure, means for advancing glass in ribbon form along the bath towards an outlet from the bath, electrical connections arranged in the pocket so as to pass electric current through a compound of an additive element for the bath supported on the molten metal in the pocket, and means for supplying a controlled direct electric current to said electrical connections to cause electrolysis of the compound and controlled entry into the bath of molten metal of additive element released by said electrolysis.

15. Apparatus according to claim 14, wherein a roof structure extends over the tank structure to define a headspace over the bath, and the pocket is located in a side wall of the tank structure and is segregated from said headspace by a partition extending downwardly into the bath metal to define with the floor of the tank a channel by which the pocket communicates with the bath.

16. Apparatus according to claim 14, wherein one electrode is positioned in the pocket above the surface level of the molten metal, another electrode is constituted by the molten metal and the current supply means is so connected to the electrodes that the molten metal in the pocket constitutes a negative electrode.

17. Apparatus according to claim 14, comprising channels formed in the tank structure and spaced apart longitudinally of the bath, by which channels the pocket communicates with the main part of the bath, and impeller means in one channel operable to cause a flow of molten metal through that channel such that molten metal enters the pocket through one channel and returns to the bath through the other channel after circulating through the pocket, whereby additive element released by the electrolysis is carried into the main part of the bath.

18. Apparatus according to claim 17, wherein the impeller means is a paddle wheel mounted in the upstream channel, and a motor connected to the paddle wheel is operable to cause the wheel to impel molten metal out of the pocket.

19. Apparatus according to claim 17, including an electric induction heater mounted in the base of the pocket and communicating with the pocket, which heater is operable to cause an upward circulation of heated molten metal in the pocket.

20. Apparatus according to claim 17, including auxiliary heating electrodes so mounted in the pocket as to dip into the compound supported on the molten metal in the pocket, said electrodes being for connection to an A.C. source operable to pass alternating current through the compound between the electrodes.

21. Apparatus according to claim 15, wherein the tank structure is extended beyond said pocket to form a reservoir for an additive element or an alloy of one or more additive elements, which reservoir is separated from said pocket, a cover extends over said pocket and reservoir to define a chamber thereover for accommodating a compound of one said additive element, one electrode is positioned in the reservoir, and another electrode is constituted by the molten metal in the pocket and the current supply means is so connected to the electrodes that said element or alloy acts as a positive electrode, whereby said compound is continually replenished by the interaction of an element released at the positive electrode with fresh additive element from said reservoir.

References Cited
UNITED STATES PATENTS

| | | | |
|---|---|---|---|
| 1,562,655 | 11/1925 | Pacz | 75—58 |
| 2,859,160 | 11/1958 | Helling | 204—67 |
| 2,915,442 | 12/1959 | Lewis | 204—67 |

FOREIGN PATENTS

| | | |
|---|---|---|
| 1,323,711 | 5/1963 | France. |

DONALL H. SYLVESTER, *Primary Examiner.*

G. R. MYERS, *Assistant Examiner.*